(12) United States Patent
Kawamura et al.

(10) Patent No.: US 10,213,079 B2
(45) Date of Patent: Feb. 26, 2019

(54) ELECTRIC VACUUM CLEANER

(71) Applicant: TOSHIBA LIFESTYLE PRODUCTS & SERVICES CORPORATION, Ome-shi (JP)

(72) Inventors: Naoko Kawamura, Aichi (JP); Yasuhiro Ohtsu, Aichi (JP); Yukio Machida, Aichi (JP); Tsutomu Inoue, Aichi (JP); Atsushi Morishita, Aichi (JP)

(73) Assignee: TOSHIBA LIFESTYLE PRODUCTS & SERVICES CORPORATION, Ome-shi (JP)

( * ) Notice: Subject to any disclaimer, the term of this patent is extended or adjusted under 35 U.S.C. 154(b) by 269 days.

(21) Appl. No.: 15/032,428

(22) PCT Filed: Nov. 7, 2014

(86) PCT No.: PCT/JP2014/079614
§ 371 (c)(1),
(2) Date: Apr. 27, 2016

(87) PCT Pub. No.: WO2015/068817
PCT Pub. Date: May 14, 2015

(65) Prior Publication Data
US 2016/0270614 A1    Sep. 22, 2016

(30) Foreign Application Priority Data

Nov. 11, 2013   (JP) ................................. 2013-233531
Dec. 24, 2013   (JP) ................................. 2013-266163

(51) Int. Cl.
*A47L 9/16*        (2006.01)
*A47L 9/00*        (2006.01)
(Continued)

(52) U.S. Cl.
CPC ............. *A47L 9/1633* (2013.01); *A47L 5/225* (2013.01); *A47L 5/24* (2013.01); *A47L 5/28* (2013.01);
(Continued)

(58) Field of Classification Search
CPC .... A47L 9/1633; A47L 9/0081; A47L 9/1641; A47L 5/24; B01D 45/16
See application file for complete search history.

(56) References Cited

U.S. PATENT DOCUMENTS 7,770,256 B1    8/2010   Fester
7,935,162 B2    5/2011   Hyun et al.
(Continued)

FOREIGN PATENT DOCUMENTS

CN    103040409 A    4/2013
EP    2 581 009 A1   4/2013
(Continued)

OTHER PUBLICATIONS

Combined Office Action and Search Report dated Mar. 30, 2016 in Chinese Patent Application No. 201480003287.1 (with English translation and English translation of Category of Cited Documents).
(Continued)

*Primary Examiner* — Weilun Lo
(74) *Attorney, Agent, or Firm* — Oblon, McClelland, Maier & Neustadt, L.L.P.

(57) ABSTRACT

An electric vacuum cleaner that can be improved in quietness without increasing in size while securing air intake balance. The electric vacuum cleaner includes an electric blower. The electric vacuum cleaner includes a separating part that separates dust sucked by the electric blower. The separating part includes a first centrifugally separating part that centrifugally separates dust sucked by the electric
(Continued)

blower. The separating part includes a plurality of second centrifugally separating parts that centrifugally separates dust smaller than dust to be separated by the first centrifugally separating part. The second centrifugally separating parts communicate with the downstream side of the first centrifugally separating part, and are disposed at positions opposite to each other with respect to the electric blower.

14 Claims, 10 Drawing Sheets

(51) Int. Cl.
    *A47L 5/24*     (2006.01)
    *B01D 45/16*     (2006.01)
    *A47L 5/22*     (2006.01)
    *A47L 5/28*     (2006.01)
    *A47L 9/22*     (2006.01)

(52) U.S. Cl.
    CPC ............... *A47L 9/0081* (2013.01); *A47L 9/16* (2013.01); *A47L 9/1608* (2013.01); *A47L 9/1625* (2013.01); *A47L 9/1641* (2013.01); *A47L 9/1658* (2013.01); *A47L 9/1691* (2013.01); *A47L 9/22* (2013.01); *B01D 45/16* (2013.01)

(56) References Cited

U.S. PATENT DOCUMENTS

| | | |
|---|---|---|
| 8,671,512 B2 | 3/2014 | Qian et al. |
| 9,144,358 B2 | 9/2015 | Smith |
| 9,211,046 B2 * | 12/2015 | Peace .................... A47L 9/1633 |
| 9,848,748 B2 * | 12/2017 | Stickney ............... A47L 9/1641 |
| 2007/0143953 A1 | 6/2007 | Hwang et al. |
| 2008/0190080 A1 | 8/2008 | Oh |
| 2008/0289140 A1 | 11/2008 | Courtney et al. |
| 2009/0211212 A1 | 8/2009 | Hyun et al. |
| 2009/0265877 A1 * | 10/2009 | Dyson ....................... A47L 5/24 15/344 |
| 2010/0139033 A1 * | 6/2010 | Makarov ............... A47L 9/1625 15/353 |
| 2013/0091815 A1 | 4/2013 | Smith |
| 2013/0160232 A1 | 6/2013 | Peace |

FOREIGN PATENT DOCUMENTS

| | | |
|---|---|---|
| JP | 7-250788 A | 10/1995 |
| JP | 2003-125995 A | 5/2003 |
| JP | 2007-160091 A | 6/2007 |
| JP | 2009-39253 A | 2/2009 |
| JP | 2011-41766 A | 3/2011 |
| JP | 2011-524215 A | 9/2011 |
| JP | 2012-120561 A | 6/2012 |
| JP | 2012-135657 A | 7/2012 |
| KR | 10-0964699 B1 | 6/2010 |
| WO | WO 2007/021044 A1 | 2/2007 |
| WO | WO 2013/077122 A1 | 5/2013 |

OTHER PUBLICATIONS

Combined Chinese Office Action and Search Report dated Sep. 29, 2016 in Patent Application No. 201480003287.1 (with English translation).
International Search Report dated Feb. 24, 2015 for PCT/JP2014/079614 filed on Nov. 7, 2014.

* cited by examiner

ELECTRIC VACUUM CLEANER

TECHNICAL FIELD

An embodiment of the present invention relates to an electric vacuum cleaner including a centrifugally separating part that centrifugally separates dust sucked by an electric blower.

BACKGROUND ART

Conventionally, for example, an electric vacuum cleaner capable of performing cleaning while being carried includes a main body part including an electric blower and a dust collecting part, etc., and an air passage body such as an extension tube connected to the main body part. While the entire electric vacuum cleaner is carried by gripping a grip handle of the main body part, the electric vacuum cleaner performs cleaning by sucking dust into the dust collecting part from the air passage body by a negative pressure generated by driving of the electric blower.

There is an electric vacuum cleaner including, as the dust collecting part of the above-described electric vacuum cleaner, a centrifugally separating part that centrifugally separates dust by turning air containing dust, and an electric blower chamber housing an electric blower and disposed in a space at the central portion of the centrifugally separating part. In this case, a circumferential wall portion of the cylindrical centrifugally separating part is disposed coaxially with the central axis of the electric blower, so that air intake is hardly unbalanced, and the air intake balance can be secured, however, coarse dust that is relatively large dust in the air containing dust must be centrifugally separated by the centrifugally separating part, so that the diameter of the circumferential wall portion must be set to be large, and therefore, downsizing is not easy. Around the electric blower chamber, basically, only the circumferential wall portion of the centrifugally separating part is positioned, so that noise such as wind noise caused by driving of the electric blower may not be sufficiently cut, and there is a likelihood that noise may be leaked to the outside.

CITATION LIST

Patent Literature

PTL 1: Japanese Translation of International Application (Kohyo) No. 2011-524215

SUMMARY OF THE INVENTION

Technical Problem

An object of the present invention is to provide an electric vacuum cleaner that can be improved in quietness while securing air intake balance without increasing in size.

Solution to Problem

An electric vacuum cleaner according to an embodiment includes an electric blower. This electric vacuum cleaner includes a separating part that separates dust sucked by the electric blower. This separating part includes a first centrifugally separating part that centrifugally separates dust sucked by the electric blower. This separating part further includes a plurality of second centrifugally separating parts that centrifugally separate dust smaller than dust to be separated by the first centrifugally separating part. These second centrifugally separating parts communicate with the downstream side of the first centrifugally separating part, and are disposed at positions opposite to each other with respect to the electric blower.

EMBODIMENTS

Hereinafter, a constitution of a first embodiment will be described with reference to FIG. 1 to FIG. 10.

Figure 1:
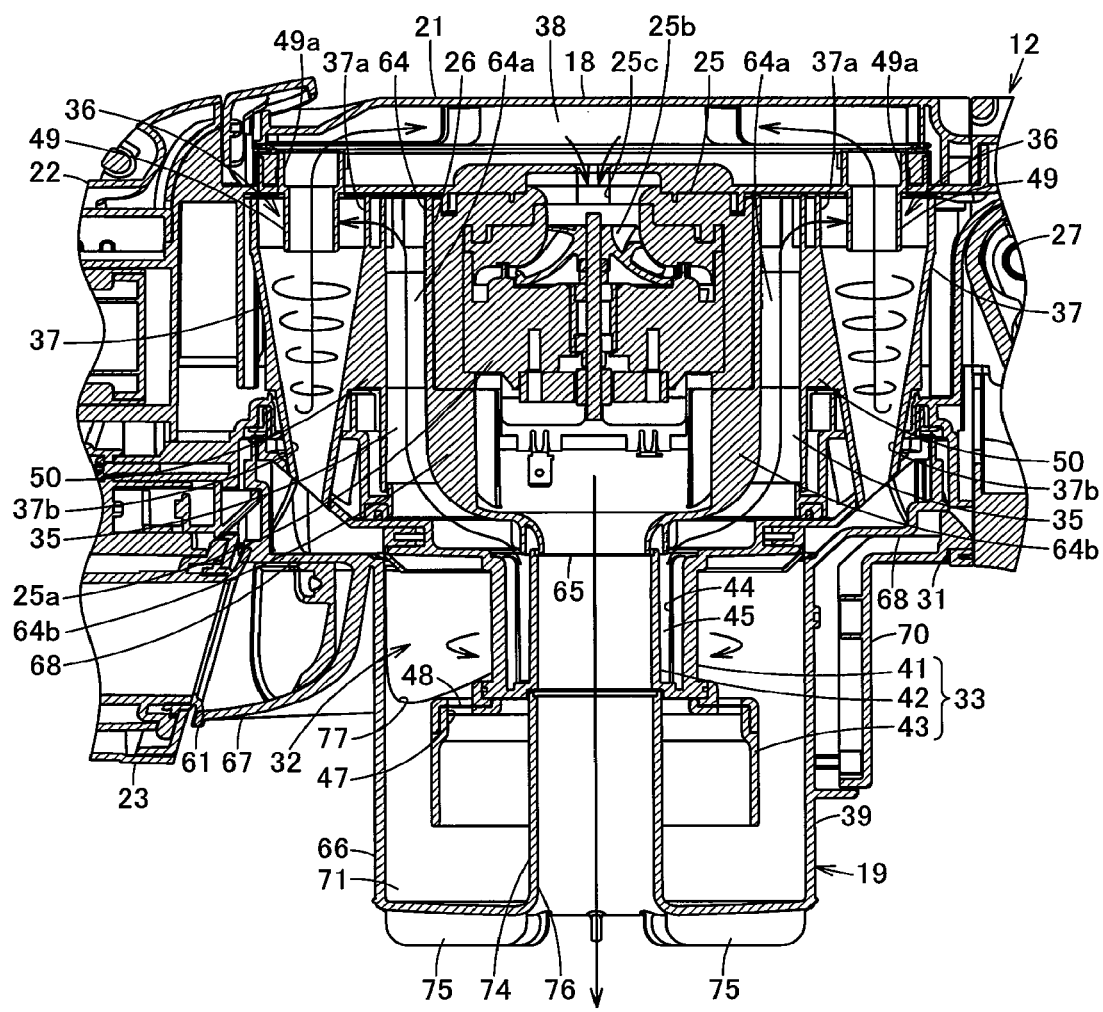
FIG. 1 is a sectional view showing a portion of a main body part of an electric vacuum cleaner according to a first embodiment.
Figure 2:
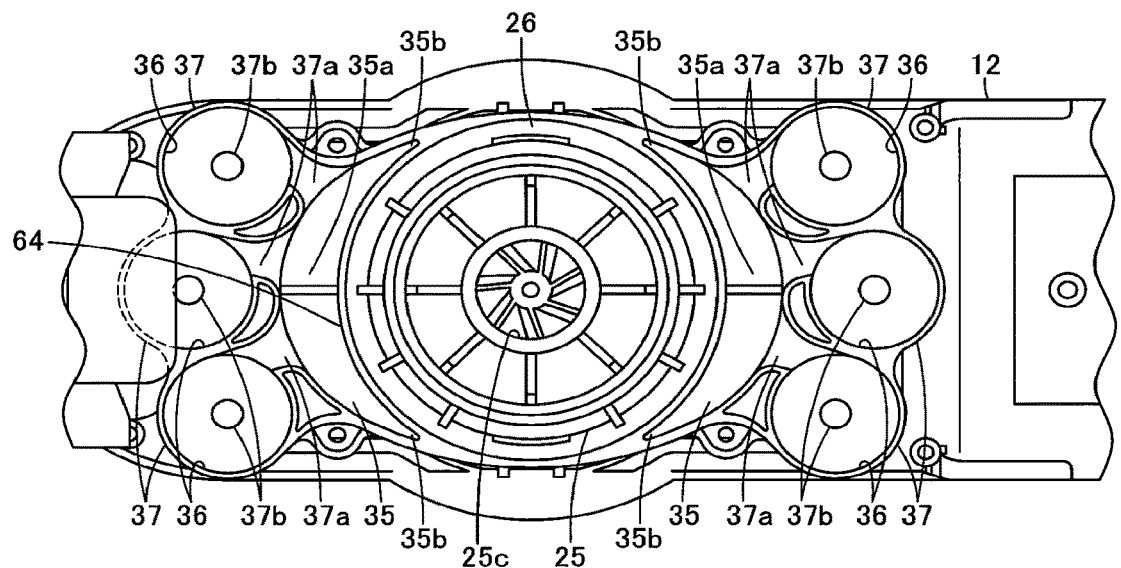
FIG. 2 is a plan view of the inside of the same main body part from above.
Figure 3:
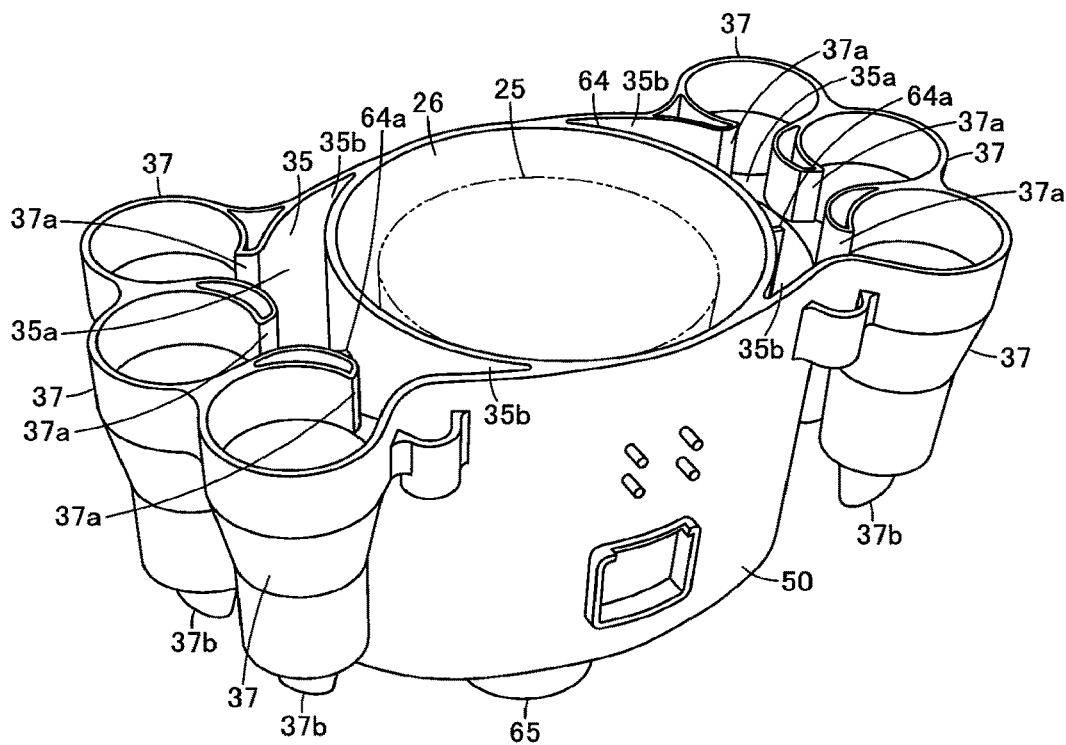
FIG. 3 is a perspective view showing a portion of the same main body part.
Figure 4:
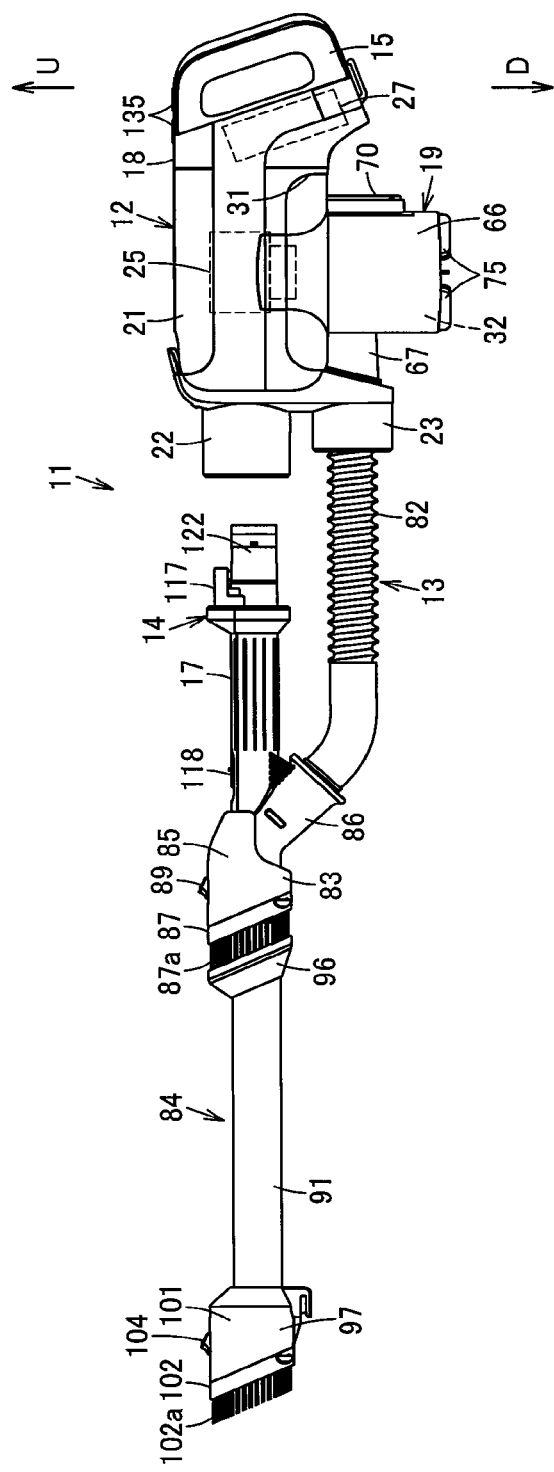
FIG. 4 is a side view showing a usage state of the same electric vacuum cleaner where an air passage body is detached from a main body part at the position of a holder part.
Figure 5:
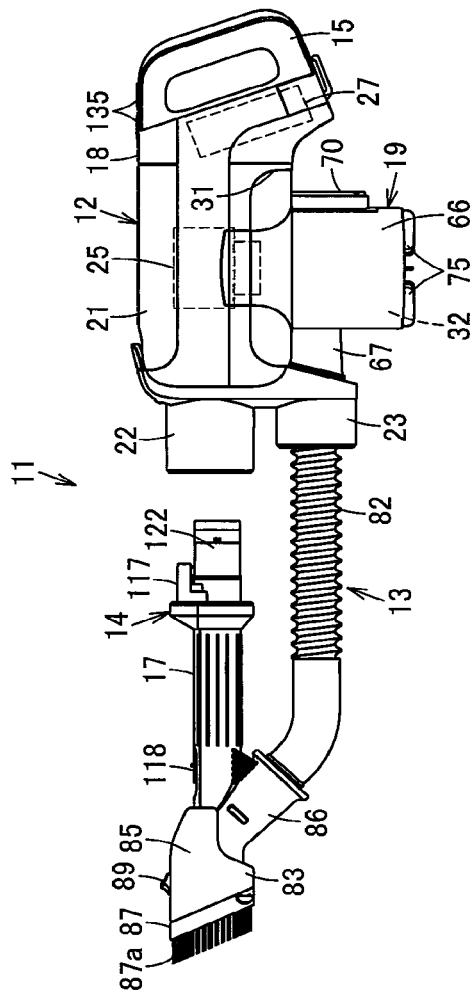
FIG. 5 is a side view showing another usage state of the same electric vacuum cleaner where the air passage body is detached from the main body part at the position of the holder part.

In FIG. 1 to FIG. 10, the reference symbol 11 denotes an electric vacuum cleaner, and for this electric vacuum cleaner 11, a mode in which the electric vacuum cleaner is used as a stick cleaner (upright cleaner) while being entirely moved as shown in FIG. 6 to FIG. 10 and a mode in which the electric vacuum cleaner is used as a handy cleaner while a portion thereof is carried as shown in FIG. 4 and FIG. 5 can be arbitrarily selected.

As shown in FIG. 1 to FIG. 10, this electric vacuum cleaner 11 includes a main body part 12 and an air passage body 13 connected to the main body part 12, and this air passage body 13 can be held with respect to the main body part 12 via a holder part 14, a main body handle 15 is provided to project from the main body part 12, and an air passage body handle 17 is provided to project from the air passage body 13. Hereinafter, the up-down direction is based on a state where the electric vacuum cleaner 11 is placed on a surface to be cleaned. That is, the arrow U direction shown in FIG. 4 shows the upward direction of the present embodiment, and the arrow D direction shows the downward direction of the present embodiment.

The main body part 12 includes a main body case 18 whose longitudinal direction is along the front-rear direction, that is, whose dimension in the front-rear direction is larger than the dimensions in the left-right width direction and the up-down direction, and a dust collecting cup 19 having a substantially bottomed cylindrical shape being a cup part as a dust storage body attachable to and detachable from the lower portion of the main body case 18.

The main body case 18 is made of, for example, synthetic resin, etc., and includes a case main body 21 longitudinal along the front-rear direction, a holder receiving part 22 provided on the upper portion of the front end portion that is an end portion in the longitudinal direction of the case main body 21, and an air passage body connecting part 23 provided on the lower portion of the front end portion of the case main body 21, that is, below the holder receiving part 22 and projects forward from the case main body 21, an electric blower 25 being a heavy load is housed inside an electric blower chamber 26, and a main body control part (not shown) that controls operation of the electric blower 25 and a secondary battery 27 that is a battery as a power supply part being a heavy load are housed in the main body case respectively. The main body handle 15 is provided integrally with the rear portion of the main body case 18 (case main body 21), and with this main body handle 15, the main body part 12 can be gripped.

In the lower portion of the case main body 21, an attaching opening part 31 which the dust collecting cup 19 is attachable to and detachable from is opened at a position at the rear of the air passage body connecting part 23. This attaching opening part 31 is opened along the up-down direction, and in this attaching opening part 31, a substantially cylindrical separating body part 33 that is inserted to the inside of the dust collecting cup 19 according to attachment of the dust collecting cup 19 to the main body case 18 (attaching opening part 31) and constitutes a first centrifugally separating part 32 being a first separating part as an upstream side separating part together with the dust collecting cup 19 is provided to project downward. Inside the case main body 21 above the attaching opening part 31, a substantially cylindrical communicating air passage part 35 that communicates with the attaching opening part 31 is partitioned at the outer circumference of the electric blower chamber 26, and outside this communicating air passage part 35, a plurality of substantially cylindrical separating cylinder parts 37 constituting second centrifugally separating parts 36 being second separating parts as a downstream-side separating part which separate dust contained in air that passed through the separating body part 33 (first centrifugally separating part 32), that is, dust smaller than dust to be separated by the first centrifugally separating part 32 are provided. Above these separating cylinder parts 37, inside the case main body 21, an air passage part 38 that communicates with these separating cylinder parts 37 (second centrifugally separating parts 36) are partitioned, and this air passage part 38 communicates with the suction side of the electric blower 25. Therefore, an air passage that communicates with the suction side of the electric blower 25 from the first centrifugally separating part 32 via the communicating air passage part 35, the second centrifugally separating parts 36, and the air passage part 38 is formed, and the first centrifugally separating part 32 and the second centrifugally separating parts 36 constitute the separating part 39 that separates dust from air.

The first centrifugally separating part 32 centrifugally separates dust (coarse dust) by turning air between the inner circumferential surface of the dust collecting cup 19 and the outer circumferential surface of the separating body part 33. Therefore, the turning flow in the first centrifugally separating part 32 has an axial direction along the up-down direction.

The separating body part 33 is formed into a cylindrical shape whose axial direction is along the up-down direction, and disposed coaxially (concentrically) with the dust collecting cup 19. This separating body part 33 includes a cylindrical separating body part main body 41, an exhaust part 42 positioned coaxially inside the separating body part main body 41, and a cylindrical compressing part 43 having a diameter larger than that of the separating body part main body 41 so that these components approximate each other in the axial direction.

The separating body part main body 41 has a plurality of openings 44 that are opened in the circumference and communicate with the communicating air passage part 35, and a separating filter 45 that covers these openings 44. That is, the outside of the separating body part main body 41 (inside of the dust collecting cup 19) and the communicating air passage part 35 communicate with each other through the openings 44. In the first centrifugally separating part 32, air turns between the outer circumferential surface of the separating body part main body 41 and the inner circumferential surface of the dust collecting cup 19.

The exhaust part 42 is molded integrally with the separating body part main body 41 and forms a double tubular shape together with the separating part main body 41. Therefore, this exhaust part 42 has a central axis substantially parallel to the central axis of the electric blower 25, and is disposed substantially coaxially with the electric blower 25.

The compressing part 43 is also called a shade part, and is increased in diameter in a phased manner and continues to the lower end portion of the separating body part main body 41, and is disposed coaxially with the separating body part main body 41. This compressing part 43 has a plurality of compression openings 47 opened along the up-down direction around the lower end portion of the separating body part main body 41, and a compression filter 48 that covers these compression openings 47. A portion of air turning between the outer circumference of the separating body part main body 41 and the inner circumference of the dust collecting cup 19 passes through the compression openings 47 (compression filter 48) from the lower end portion of the compressing part 43 via the inside of the compressing part 43, and accordingly presses dust centrifugally separated by the first centrifugally separating part 32 against the compression filter 48 to compress the dust inside the compressing part 43.

The communicating air passage part 35 is disposed along the up-down direction on the front side and the rear side of the electric blower chamber 26, and expands both leftward and rightward. That is, this communicating air passage part 35 is formed continuously across the entire up-down direction of the electric blower chamber 26 so as to be adjacent to the front portion and the rear portion of the electric blower chamber 26. This communicating air passage part 35 is formed so that the central portion 35a in the direction between both sides becomes wider in the front-rear direction than both side portions 35b and 35b, and the air passage section has a substantially crescentic shape so as to become gradually wider in the front-rear direction from both side portions 35b and 35b toward the central portion 35a (separated from the electric blower 25 (electric blower chamber 26)). Therefore, in this communicating air passage part 35, the flow velocity at the central portion 35a is smaller than the flow velocities at both side portions 35b and 35b, so that the air flow volume is made equal between the central portion 35a and both side portions 35b and 35b.

The second centrifugally separating parts 36 are positioned above the first centrifugally separating part 32, that is, in the present embodiment, higher than the upper end portion of the first centrifugally separating part 32, and centrifugally separate dust (fine dust) by turning air along the inner surfaces of the separating cylinder parts 37. Therefore, the turning flows in the second centrifugally separating parts 36 have axial directions along the up-down direction.

Each separating cylinder part 37 has an axial direction along the up-down direction at a position lateral to the communicating air passage part 35 (electric blower chamber 26), and is gradually decreased in diameter from the upper end portion toward the lower end portion. That is, these separating cylinder parts 37 (second centrifugally separating parts 36) have axial directions substantially parallel to the communicating air passage part 35 (electric blower 25). The diameter of each separating cylinder part 37 is set to be smaller than the diameter of the dust collecting cup 19. Therefore, the second centrifugally separating parts 36 are set so that the flow velocities of the turning flows in the second centrifugally separating parts 36 become higher than the flow velocity of the turning flow in the first centrifugally separating part 32. Further, each plurality, for example, three each of the separating cylinder parts 37 are disposed on the respective front and rear sides of the communicating air passage part 35 (electric blower 25), so that they are at substantially equal intervals along an arc that is along the circumferential direction of the communicating air passage part 35 (electric blower 25) as viewed from above. Therefore, each plurality (three) of these separating cylinder parts 37 (second centrifugally separating parts 36) are disposed on the respective positions opposite to each other with respect to the electric blower 25, positioned axisymmetric to each other in the front-rear direction about the central axis of the electric blower 25, and disposed radially around the central axis of the electric blower 25. Near the upper ends of the separating cylinder parts 37, suction opening parts 37a that communicate with the communicating air passage part 35 and guide air containing dust along the tangential direction into the separating cylinder parts 37 are opened in the sideward directions crossing the axial direction. Therefore, the suction opening parts 37a of the second centrifugally separating parts 36 are positioned axisymmetric in the front-rear direction about the central axis of the electric blower 25.

Further, the lower end portions of the separating cylinder parts 37 serve as dust discharge ports 37b which are opened so as to face the upper portion of the dust collecting cup 19 and discharge dust to the dust collecting cup 19. On the upper end portions of the separating cylinder parts 37, cylindrical discharge cylinder parts 49 through which air from which dust was centrifugally separated reaches the air passage part 38 are disposed coaxially with the separating cylinder parts 37, and the upper end portions that are downstream ends of the discharge cylinder parts 49 serve as discharge opening parts 49a of the second centrifugally separating parts 36 through which air inside the separating cylinder parts 37 are discharged. Further, the electric blower 25 (electric blower chamber 26) sides, that is, the communicating air passage part 35 sides of the separating cylinder parts 37 are partitioned from each other via the communicating air passage part 35 and a partition part 50. This partition part 50 is formed into, for example, a cylindrical shape having an oblong (oval) section long in the front-rear direction, forms the outside portion of the communicating air passage part 35 and the portions on the electric blower 25 sides of the separating cylinder parts 37, and also serves as wall portions of the communicating air passage part 35 and the separating cylinder parts 37. This partition part 50 is molded integrally with the separating cylinder parts 37 of the second centrifugally separating parts 36 from the same material as that of the separating cylinder parts 37.

The suction opening parts 37a are opened toward the communicating air passage part 35 side, that is, the electric blower 25 side along the tangential directions of the separating cylinder parts 37 and the normal direction of the communicating air passage part 35. These suction opening parts 37a are set to be substantially equal in length to each other, and the distances from the outer edge portion of the communicating air passage part 35 to the separating cylinder parts 37 are substantially equal to each other.

The discharge opening parts 49a are positioned at substantially the same height as that of the intake port 25c at predetermined distances substantially equal to each other from the intake port 25c, and directly communicate with the intake port 25c via the air passage part 38 positioned linearly along the horizontal direction.

The air passage part 38 is positioned so as to extend in the front-rear direction along the upper portion of the inside of the case main body 21 of the main body case 18, and connected airtightly to the discharge opening parts 49a that are downstream ends of the discharge cylinder parts 49 respectively.

The holder receiving part 22 is positioned on the front side that is one lateral side lateral to the axial direction of a turning flow in the first centrifugally separating part 32, and projects from the front portion of the case main body 21. This holder receiving part 22 is formed into a tubular shape opened forward, and inside this holder receiving part 22, an engagement receiving portion (not shown) that detachably locks the air passage body 13 to the main body part 12 is recessed.

The air passage body connecting part 23 is formed into a cylindrical shape whose axial direction is along the front-rear direction and the horizontal direction, and positioned below (just below) the holder receiving part 22 and on the front side that is one lateral side lateral to the axial directions of the turning flows in the second centrifugally separating parts 36 so as to project from the front portion of the case main body 21. That is, these holder receiving part 22 and air passage body connecting part 23 are respectively positioned on the front side that is the same lateral side of the main body part 12, and positioned one above the other when the main body part 12 (main body case 18) is viewed from the front side. This air passage body connecting part 23 is a part to be connected airtightly to the dust collecting cup 19, and inside this air passage body connecting part 23, a cylindrical sealing part 61 to airtightly connect the air passage body 13 and the dust collecting cup 19 to the air passage body connecting part 23 is disposed.

The electric blower 25 includes an electrically-driven part 25a to be driven by power supply from the secondary battery and a centrifugal fan 25b to be rotated by the electrically-driven part 25a, and forms sucking wind for sucking dust into the dust collecting cup 19 by generating a negative pressure by rotating the centrifugal fan 25b by the electrically-driven part 25a. This electric blower 25 is positioned at the substantially central portion in the front-rear direction and the left-right direction of the case main body 21 (main body case 18) so as to be higher than the first centrifugally separating part 32, and entirely covered and housed in the electric blower chamber 26 in a state where the electrically-driven part 25a is positioned on the lower side and the centrifugal fan 25b is positioned on the upper side. Therefore, this electric blower 25 is disposed inside the electric blower chamber 26 so that the intake port 25c that is the suction side communicating with the upstream side of the centrifugal fan 25b is on the upper side, and an exhaust port (not shown) that is the exhaust side communicating with the downstream side of the electrically-driven part 25a is on the lower side. That is, this electric blower 25 is disposed so as to have a component parallel to the axial direction (of the turning flow) in the first centrifugally separating part 32 (dust collecting cup 19), that is, an up-down component. In other words, this electric blower 25 is disposed along a direction different from the horizontal direction, and positioned so that its central axis (rotary axis) crosses the central axis (of the turning flow) of the first centrifugally separating part 32 (dust collecting cup 19) at an acute angle (preferably, an acute angle not more than 45 degrees) as viewed from the side, or coaxial with this central axis. That is, this electric blower 25 is disposed in series with the first centrifugally separating part 32 (dust collecting cup 19) in the up-down direction, and positioned on the extension of the central axis of the first centrifugally separating part 32 (dust collecting cup 19). The periphery of this electric blower 25 is elastically supported with respect to the electric blower chamber 26 via a plurality of vibration isolating members (not shown) made of an elastic material, for example, rubber or elastomer, etc. The suction side (intake port 25c) of this electric blower 25 is positioned near the upper portion of the inside of the main body part 12 and communicates with the downstream sides of the second centrifugally separating parts 36 (via the air passage part 38), and communicates with the first centrifugally separating part 32 (dust collecting cup 19) via these air passage part 38, second centrifugally separating parts 36, and communicating air passage part 35.

The electric blower chamber 26 is formed into a substantially cylindrical shape, and positioned at the substantially central portion in the front-rear direction and the left-right direction of the main body case 18 of the main body part 12, and three each of the separating cylinder parts 37 are disposed at the respective front and rear sides of the electric blower chamber 26 via the communicating air passage part 35. In other words, the communicating air passage part is positioned between the electric blower chamber 26 (electric blower 25) and the separating cylinder parts 37. This electric blower chamber 26 and the communicating air passage part 35 are partitioned from each other via a partition 64. At the central portion of the lower portion of the electric blower chamber 26, a discharge opening 65 that communicates with the exhaust side (exhaust port) of the electric blower 25 is opened downward. That is, this discharge opening 65 is positioned at the lower portion of the main body case 18 of the main body part 12, and communicates with the inside of the separating body part 33.

The partition 64 is formed into a substantially cylindrical shape and respectively forms portions of the electric blower chamber 26 and the inside portion of the communicating air passage part 35, and also serves as a wall portion between the electric blower chamber 26 and the inside portion of the communicating air passage part 35. That is, the communicating air passage part 35 is partitioned between the partition part 50 and the partition 64. Both left and right side portions of the outer circumferential portion of this partition 64 are joined integrally to the partition part 50. That is, this partition 64 is molded integrally with the partition part 50 and the separating cylinder parts 37 from the same material as that of the partition part 50 and the separating cylinder parts 37. In other words, this partition 64 is positioned on the inner side of the partition part 50, and is disposed coaxially with the electric blower 25 so that both side portions continue integrally to the partition part 50. Therefore, by the strengths of these partition 64 and partition part 50, the width of the communicating air passage part 35, that is, the distances between the electric blower 25 (intake port 25c) and communicating air passage part 35, and the second centrifugally separating parts 36 are kept constant. Further, from the central portions in the left-right direction of the outer circumferential portion of the partition 64, projecting portions 64a for reinforcing the communicating air passage part 35 project in the forms of ribs along the radial direction (front-rear direction), respectively, so as to be positioned at the central portions in the left-right direction inside the communicating air passage part 35, and these projecting portions 64a are joined integrally to the partition part 50. The lower end side of this partition 64 is gradually decreased in diameter toward the discharge opening 65, and through this discharge opening 65, exhaust air of the electric blower 25 can be discharged from the electric blower chamber 26 in a concentrated manner. From the inner circumferential portion, that is, the electric blower chamber 26 side of this partition 64, a plurality of supporting ribs 64b project along radial directions toward the central axis side as supporting units that support the electric blower 25 from below against the gravity.

The main body control part includes, for example, a microcomputer, etc., and can operate and stop the electric blower 25 in a predetermined operation mode by controlling the conduction angle of the electric blower 25.

The secondary battery 27 supplies power to the electric blower 25, the main body control part, and the air passage body 13 side, etc., and is connectable to an external charging circuit via a terminal (not shown), and chargeable via this charging circuit as necessary. This secondary battery 27 is housed along the up-down direction at the position of the rear end portion of the case main body 21 (main body case 18), that is, a rear position that is the other lateral side lateral to the axial direction of the turning flows in the separating part 39 (first and second centrifugally separating parts 32 and 36). In other words, the holder receiving part 22 and air passage body connecting part 23, and the secondary battery 27 are positioned on the sides opposite to each other of the main body part 12 via the separating part 39 (first and second centrifugally separating parts 32 and 36 (dust collecting cup 19)).

The dust collecting cup 19 is a part that collects dust sucked by driving of the electric blower 25, and includes a dust collecting cup main body 66 that is a storage part as a first dust storage part having a bottomed cylindrical shape, an introduction part 67 projecting from the front portion of the dust collecting cup main body 66, and a fine dust receiving part 68 as a second dust storage part provided integrally with the upper portion of the dust collecting cup main body 66. To the rear portion of the dust collecting cup main body 66 of the dust collecting cup 19, a clamp 70 as a holding unit that detachably locks and holds the dust collecting cup 19 to the main body case 18 (attaching opening part 31) is attached.

The dust collecting cup main body 66 is molded integrally with, for example, the introduction part 67 and the fine dust receiving part 68 by using a member such as a (transparent) synthetic resin with translucency. This dust collecting cup main body 66 is a part to be positioned around the separating body part 33 in the state where the dust collecting cup 19 is attached to the main body case 18 (attaching opening part 31). That is, this dust collecting cup main body 66 constitutes the first centrifugally separating part 32 together with the separating body part 33, and the lower portion of the dust collecting cup main body serves as a dust storing part 71 that stores dust centrifugally separated by the first centrifugally separating part 32. This dust collecting cup main body 66 has a diameter set to be larger than the diameters of the respective separating cylinder parts 37. An exhaust tube part 74 as a discharge part is formed integrally with the bottom portion of the dust collecting cup main body 66 so as to become coaxial (concentric) with the dust collecting cup main body 66, that is, along the central axis of the dust collecting cup main body 66, and from the outer surface portion of this bottom portion, a plurality of ribs 75 as air guide parts project along radial directions respectively.

The exhaust tube part 74 is a part through which exhaust air of the electric blower 25 is discharged to the outside of the main body part 12, and is inserted into the insides of the compressing part 43 and the separating body part main body 41 of the separating body part 33 and connected coaxially airtightly to the lower end portion of the exhaust part 42 and connected airtightly to the discharge opening 65 on the lower portion of the electric blower chamber 26 via this exhaust part 42 in the state where the dust collecting cup 19 is attached to the main body case 18 (attaching opening part 31). That is, this exhaust tube part 74 is connected airtightly to the exhaust side (exhaust port) of the electric blower 25. In other words, the discharge opening 65 communicating with the exhaust side (exhaust port) of the electric blower 25 is connected airtightly to the upstream side of the exhaust tube part 74 (via the exhaust part 42). Therefore, the outsides of the exhaust part 42 and the exhaust tube part 74 communicate with the suction side of the electric blower 25, and the insides of the exhaust part 42 and the exhaust tube part 74 communicate with the exhaust side of the electric blower 25 so that these suction side and the exhaust side are partitioned from each other as separate chambers. The lower end portion that is the downstream end of this exhaust tube part 74 serves as an exhaust opening 76 which communicates with the discharge opening 65 and through which exhaust air of the electric blower 25 is discharged to the outside of the main body part 12.

The ribs 75 guide exhaust air discharged from the exhaust tube part 74 along the radial directions.

The introduction part 67 introduces air containing dust into the dust collecting cup main body 66 at a position near the upper end of the dust collecting cup main body 66, that is, a position facing the front side of the separating body part main body 41 (separating filter 45) of the separating body part 33 inserted into the dust collecting cup main body 66 (dust collecting cup 19), and the front end portion that is the upstream end portion thereof is connected airtightly to the downstream side of the air passage body connecting part 23 via the sealing part 61 in the state where the dust collecting cup 19 is attached to the main body case 18 (attaching opening part 31). At the rear end portion that is the downstream end of the introduction part 67, a suction port 77 for introducing air containing dust into the dust collecting cup main body 66 (dust collecting cup 19) is opened along the tangential direction of the dust collecting cup main body 66. This suction port 77 is disposed at substantially the same height as that of the separating body part 33 in the up-down direction, that is, the axial direction of the turning flow in the first centrifugally separating part 32. Therefore, this suction port 77 is positioned so as to be lower than the electric blower 25 and deviates (in the up-down direction) from the intake port 25c and the exhaust port of the electric blower 25.

The fine dust receiving part 68 communicates with the lower portions of the lower end portions of the second centrifugally separating parts 36 (separating cylinder parts 37) in the state where the dust collecting cup 19 is attached to the main body case 18 (attaching opening part 31), and stores dust centrifugally separated by the second centrifugally separating parts 36. This fine dust receiving part 68 extends along the front-rear direction crossing (orthogonal to) the axial direction of the dust collecting cup main body 66 at a position near the upper end portion of the dust collecting cup main body 66, and is curved into a tray shape opened upward as viewed from the front-rear direction.

The clamp 70 is disposed to assume a substantially L shape from the upper end of the rear portion of the dust collecting cup main body 66 to the lower portion of the rear portion of the fine dust receiving part 68.

On the other hand, the air passage body 13 includes a stretchable hose body 82 whose rear side that is the downstream side is communicatively connected to the front side that is the upstream side of the air passage body connecting part 23, a suction port body part 83 to which the front side that is the upstream side of the hose body 82 is communicatively connected, and an attachment part 84 that is detachably communicatively connected to the front side that is the upstream side of the suction port body part 83. This air passage body 13 can be selectively used in a state where the air passage body is held by the holder part 14 with respect to the main body part 12 and a state where the air passage body is detached from the main body part 12 at the position of the holder part 14 according to a manner of cleaning.

One end side that is the downstream end side, that is, the rear end side of the hose body 82 is connected airtightly to the main body part 12 (air passage body connecting part 23 (sealing part 61)), and the other end side that is the upstream end side, that is, the front end side is held by the holder part 14 and connected airtightly to the suction port body part 83 (attachment part 84). Therefore, the downstream end side of this hose body 82 communicates with the dust collecting cup 19 (first centrifugally separating part 32) via the air passage body connecting part 23, and further communicates with the suction side of the electric blower 25 via the dust collecting cup 19, the communicating air passage part 35, the separating cylinder parts 37 (second centrifugally separating parts 36), and the air passage part 38. This hose body 82 is formed into a bellows shape from, for example, a synthetic resin, etc., with flexibility, to be stretchable, and biased toward the contracting direction. That is, this hose body 82 is maximally contracted in its natural state (no-load state), and is formed so that concavities and convexities on the inner surface adhere to each other to become flat in this maximally contracted state. In other words, this hose body 82 is stretched only when it is kept in a state where the hose body is pulled toward both ends by an external force (a state where the upstream side is pulled with respect to the downstream side fixed to the main body part 12 side).

The suction port body part 83 is provided on the front end portion that is the upstream end portion of the hose body 82. This suction port body part 83 includes a cylindrical suction port body part main body 85, a cylindrical connecting part 86 that communicates with the suction port body part main body 85 and projects from the lower side of the rear portion of the suction port body part main body 85, a brush part 87 as a cleaning part disposed rotatably on the front end portion that is the upstream end portion of the suction port body part main body 85, and a holding clamp 89 that detachably locks and holds the attachment part 84 to the suction port body part 83.

The suction port body part main body 85 is formed into a straight tubular shape from a synthetic resin, etc., that is a member harder than the hose body 82, and provided so that its rear end portion that is the downstream end portion becomes integral with the holder part 14.

The connecting part 86 assumes a straight tubular shape whose axial direction inclines along a direction crossing at an acute angle the axial direction of the suction port body part main body 85, and is provided integrally with the suction port body part main body 85, and into the connecting part 86, the upstream side end portion of the hose body 82 is inserted and connected airtightly.

The brush part 87 is formed into an annular shape having a plurality of brush bristles 87a as cleaning members on the front end portion, and both sides of the inner edge are axially supported rotatably by both side portions of the front end portion that is the upstream end portion of the suction port body part main body 85 so that the brush part 87 becomes rotatable in the up-down direction crossing the axial direction of the suction port body part main body 85.

The holding clamp 89 is partially exposed to the upper portion of the suction port body part main body 85 so as to become operable.

The attachment part 84 is attached to and detached from the suction port body part 83 as necessary according to a manner of cleaning, and includes, for example, an extension tube 91 that is a straight long tube, and a floor brush 92 as a suction port body attachable to and detachable from the front end that is the upstream end of the extension tube 91.

The extension tube 91 includes a connecting port part 96 on the rear end portion that is the downstream end portion, and a suction port part 97 on the front end portion that is the upstream end portion. The connecting port part 96 is a portion to be inserted into the front end portion of the suction port body part 83 when the attachment part 84 (extension tube 91) is connected to the suction port body part 83. The suction port part 97 includes a cylindrical suction port part main body 101, a brush bristle part 102 as a cleaning body part disposed rotatably on the front end portion that is the upstream end portion of the suction port part main body 101, and a clamp part 104 that detachably locks and holds the floor brush 92 to the suction port part 97.

The brush bristle part 102 is formed into an annular shape having a plurality of brush bristles 102a as extension tube cleaning members on the front end portion, and both sides of the inner edge of the brush bristle part 102 are axially supported rotatably on both side portions of the front end portion that is the upstream end portion of the suction port part main body 101 and rotatable in the up-down direction crossing the axial direction of the suction port part main body 101.

The clamp part 104 is partially exposed to the upper portion of the suction port part main body 101 so as to become operable.

The floor brush 92 has a case body 106 longitudinal along the left-right width direction, that is, horizontally long, and a rotary tube 107 connected rotatably to the rear portion of this case body 106.

In the case body 106, a suction port (not shown) is opened in the lower surface that faces a surface to be cleaned. In this suction port, a rotary brush as a rotary cleaning body may be disposed.

The rotary tube 107 is axially supported rotatably at least around the axis with respect to the case body 106, and communicates with the suction port. The rear end side (downstream end side) of this rotary tube 107 has a diameter substantially equal to that of the downstream end side of the extension tube 91, and is attachable to and detachable from the suction port body part 83 as well as the suction port part 97.

The holder part 14 makes a position different from the downstream end portion of the hose body 82 that is the downstream end side of the air passage body 13, that is, in the present embodiment, the suction port body part 83 on the upstream side of the hose body 82 attachable to and detachable from the main body part 12 (holder receiving part 22), and consists of an air passage body handle 17 that is provided integrally with the suction port body part main body 85 of the suction port body part 83 and branched in parallel to the hose body 82, a joint part 117 positioned on the rear end portion of the air passage body handle 17, and a clamp body 118 as a lock means provided on the air passage body handle 17. That is, the air passage body handle 17 constitutes a portion of the holder part 14. In other words, the holder part 14 also serves as the air passage body handle 17, and a position different from the hose body 82 that is on the downstream side of the air passage body 13, that is, in the present embodiment, the front end portion of holder part 14 is integrally provided with the suction port body part 83 on the further upstream side than that of the hose body 82. By this holder part 14, the air passage body 13 is made attachable to and detachable from the main body part 12 at a position higher than the hose body 82.

The air passage body handle 17 is for gripping the air passage body 13 detached from the main body part 12 at the position of the holder part 14, and is made of a member such as a synthetic resin harder than the hose body 82, formed coaxially with the suction port body part main body 85 and aligned with the suction port body part main body 85 on a substantially straight line, and projects more rearward than the suction port body part main body 85 and extends to be longitudinal along the front-rear direction.

The joint part 117 is a part that continues to the rear end portion of the air passage body handle 17 (locates at the rear end side that is one end side of the holder part 14) and fits the holder receiving part 22 of the main body part 12, and includes a cylindrical connecting projection part 122 projecting rearward. This connecting projection part 122 is a part that is inserted and fitted into the holder receiving part 22 when the air passage body 13 is attached to the main body part 12 by the holder part 14.

The clamp body 118 is partially exposed to the upper portion of the front side of the air passage body handle 17 so as to become slidable along, for example, the front-rear direction, and a claw part (not shown) to be latched into an engagement receiving portion of the holder receiving part 22 is exposed to the upper portion of the connecting projection part 122.

The main body handle 15 is looped in the up-down direction so as to open in the left-right direction crossing (orthogonal to) the longitudinal direction of the main body part 12 between the main body handle 15 and the rear portion of the main body part 12. That is, this main body handle 15 is formed along the up-down direction. On the upper portion of the main body handle 15, a plurality of setting buttons 135 to be used by a user to perform setting operations, etc., of the electric blower 25 by a hand gripping the main body handle 15 are disposed so as to be separated from each other in the front-rear direction.

Next, operation of the first embodiment described above is described.

Figure 6:
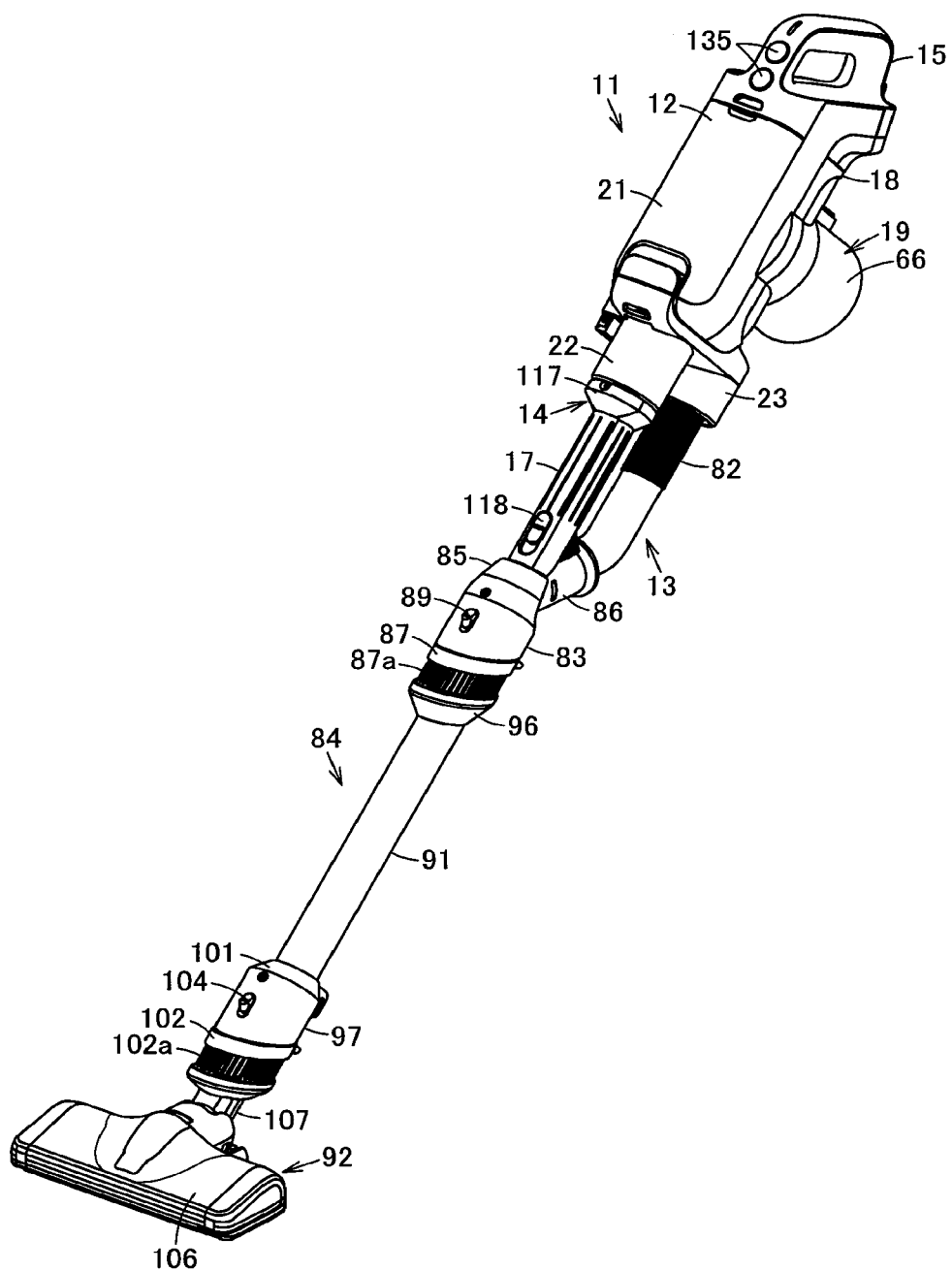
FIG. 6 is a perspective view showing a usage state of the same electric vacuum cleaner where the air passage body is attached to the main body part by the holder part.
Figure 7:
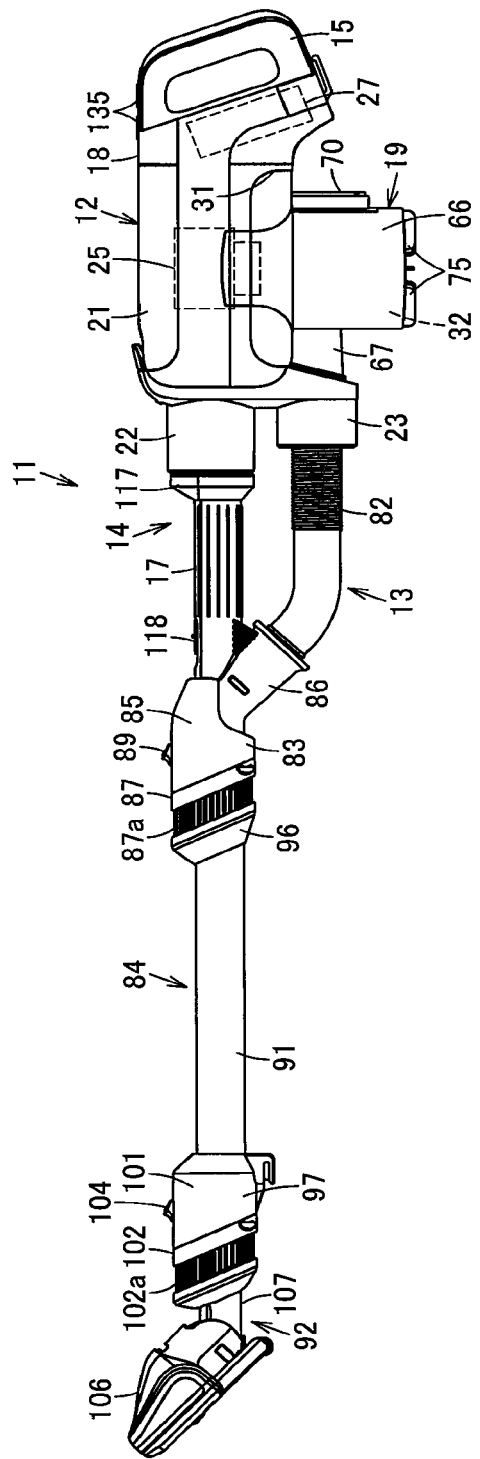
FIG. 7 is a side view showing a usage state of the same electric vacuum cleaner.

For example, in the case where the electric vacuum cleaner 11 cleans a surface to be cleaned of a comparatively wide area such as an indoor floor surface, as shown in FIG. 6 and FIG. 7, the air passage body 13 is attached to the main body part 12 by the holder part 14 at the position of the holder receiving part 22, and cleaning is performed while the entire electric vacuum cleaner 11 is moved by gripping the main body handle 15.

At this time, the dust collecting cup 19 is attached to the main body case 18 in advance. That is, by aligning the dust collecting cup 19 with the attaching opening part 31 of the main body case 18 and pushing the dust collecting cup 19 into the main body case 18 side, the fine dust receiving part 68 faces the lower end portions of the second centrifugally separating parts 36 (separating cylinder parts 37) and communicates with the dust discharge ports 37b, and the separating body part 33 is inserted coaxially into the dust collecting cup main body 66, the exhaust tube part 74 is inserted into the separating body part 33, connected airtightly to the exhaust part 42, and connected airtightly to the discharge opening 65 via the exhaust part 42, and in the state where the front end portion that is the upstream end portion of the introduction part 67 is connected airtightly to the rear end portion that is the downstream side of the air passage body connecting part 23 (air passage body 13) via the sealing part 61, the dust collecting cup 19 is locked and held to the main body case 18 by the operation of the clamp 70.

Into the front end portion that is the upstream end portion of the suction port body part 83 of the air passage body 13, the connecting port part 96 of the extension tube 91 is inserted and connected, and into the front end portion that is the upstream end portion of the suction port part 97 of the extension tube 91, the rotary tube 107 of the floor brush 92 is inserted and connected. At this time, the extension tube 91 is locked and held while being connected airtightly to the suction port body part 83 by the operation of the holding clamp 89, and the floor brush 92 is locked and held while being connected airtightly to the extension tube 91 by the operation of the clamp part 104.

Further, in the holder part 14, by inserting and fitting the joint part 117 of the rear end portion of the air passage body handle 17 shown in FIG. 4 to the holder receiving part 22 of the main body part 12 from the front side while they are aligned with each other, the connecting projection part 122 is inserted relatively into the holder receiving part 22, and the claw part of the clamp body 118 is inserted and latched into the engagement receiving portion, and accordingly, the air passage body 13 is held on the main body part 12 at the position of the holder part 14. In this state, as shown in FIG. 6 and FIG. 7, the air passage body handle 17 constituting a portion of the holder part 14 is positioned along the front-rear direction, and the suction port body part 83 coaxial with the air passage body handle 17 is positioned so as to assume a straight tubular shape along the front-rear direction, and accordingly, the air passage body 13 reaches a state where the floor brush 92, the extension tube 91 (attachment part 84), the suction port body part 83, and the air passage body handle 17 are positioned on a substantially straight line, and the downstream end side of the hose body 82 branching downward from the suction port body part 83 is connected to the main body part 12 by the air passage body connecting part 23 positioned lower than the holder part 14. As a result, by the holder part 14, the shape of the hose body 82 is kept from the upstream side to the downstream side in a state where it is gently curved from the upper side to the lower side, and the air passage body 13 communicates substantially straight with the first centrifugally separating part 32 basically along the front-rear direction without sharply curving upward, downward, leftward, or rightward. Therefore, pressure loss inside the air passage body 13 is small, and air and dust easily pass through the inside of the air passage body 13. That is, the air passage body 13 is mechanically connected to the main body part 12 at the position of the holder part 14 and the position on the downstream end side of the hose body 82, in other words, at the positions arranged vertically, and communicates as an air passage with the main body part 12 at the position on the downstream end side of the hose body 82.

A user drives the electric blower 25 in a desired operation mode via the main body control part by operating the setting buttons 135 while gripping the main body handle 15. A negative pressure generated by driving of the electric blower 25 is applied to the suction port of the floor brush 92 via the air passage part 38, the second centrifugally separating parts 36, the communicating air passage part 35, the first centrifugally separating part 32, the introduction part 67, the air passage body connecting part 23 (sealing part 61), the hose body 82, the suction port body part 83, and the attachment part 84, so that dust is sucked together with air from the suction port by the action of the negative pressure of the electric blower 25 on a surface to be cleaned while the user makes the floor brush 92 placed on the surface to be cleaned travel alternately forward and backward on a surface to be cleaned together with the entire electric vacuum cleaner 11. The user also performs a cleaning assisting operation such as scraping-off dust from the surface to be cleaned or polishing the surface to be cleaned by rotationally driving the rotary brush of the floor brush 92 as necessary.

At this time, air sucked together with dust, that is, air containing dust moves to the floor brush 92, the extension tube 91, the suction port body part 83, and the hose body 82, and is sucked into the dust collecting cup 19 (dust collecting cup main body 66) of the first centrifugally separating part 32 along the tangential direction from the downstream end of the hose body 82 via the air passage body connecting part 23 (sealing part 61), the introduction part 67, and the suction port 77 while gently curving along the inner surface of the hose body 82.

Figure 8:
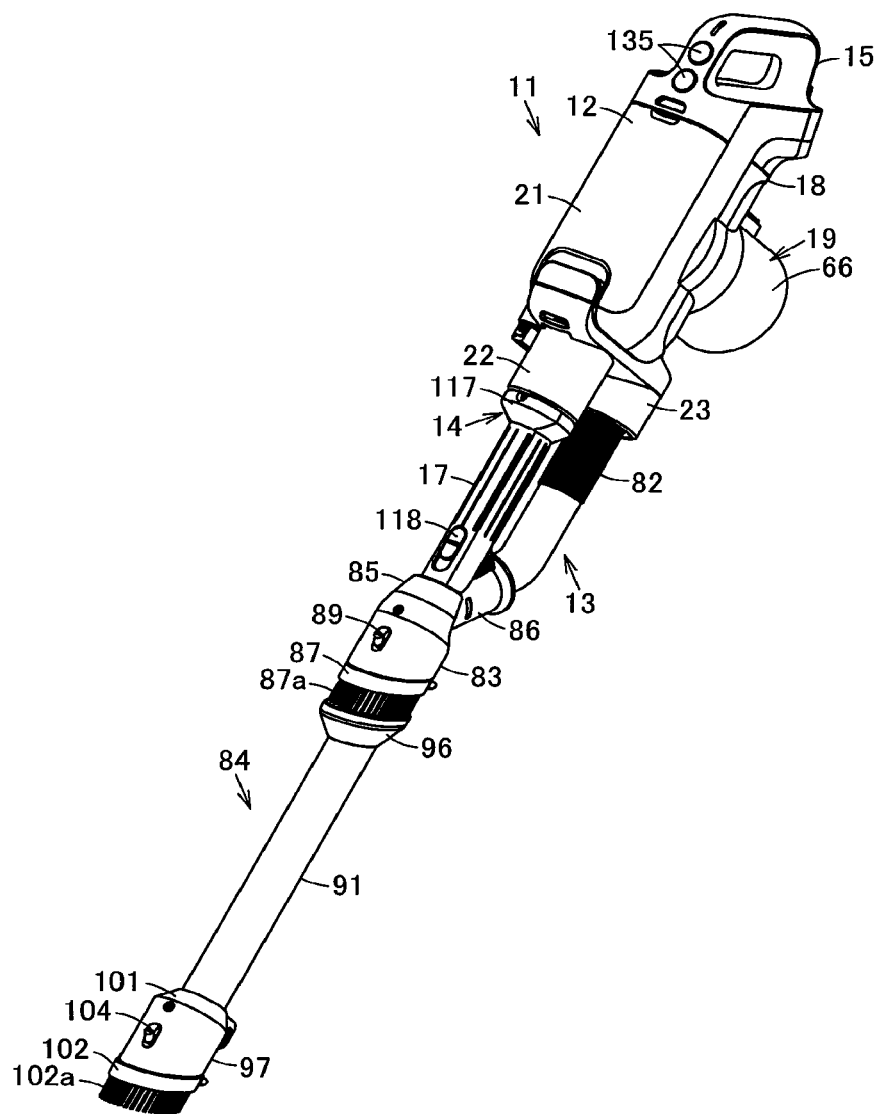
FIG. 8 is a perspective view showing another usage state of the same electric vacuum cleaner where the air passage body is attached to the main body part by the holder part.

According to the necessity of cleaning a narrow space into which the floor brush 92 cannot be inserted, for example, a space between furniture and a wall portion, the electric vacuum cleaner 11 can also be used in the state where the floor brush 92 is detached from the extension tube 91 (FIG. 8). In this case, by operating the holding clamp 89, the floor brush 92 is unlocked and detached from the extension tube 91. Then, the user performs cleaning of the surface to be cleaned by making the electric vacuum cleaner 11 suck dust together with air from the suction port part 97 in the same manner as described above while using the brush bristle part 102 of the suction port part 97 on the front end portion of the extension tube 91, etc.

Figure 9:
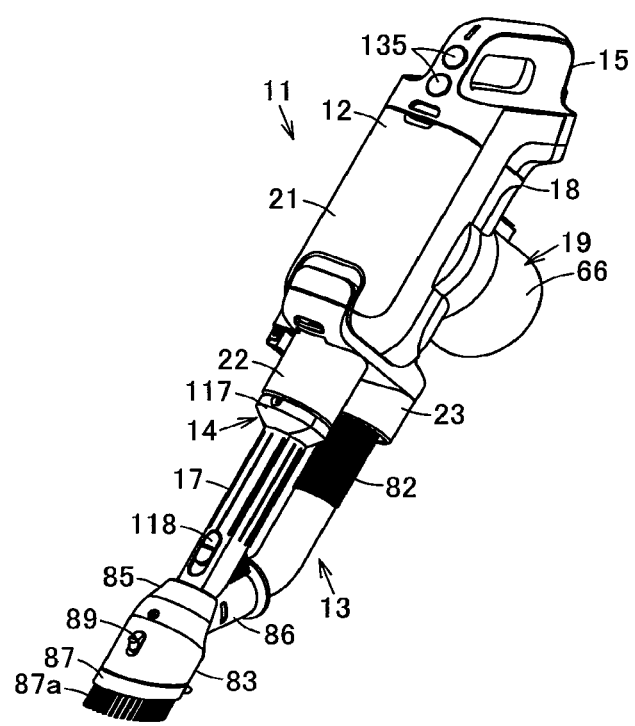
FIG. 9 is a perspective view showing still another usage state of the same electric vacuum cleaner where the air passage body is attached to the main body part by the holder part.

On the other hand, in the case of cleaning of the surface of a table and a surface to be cleaned of a comparatively narrow area, etc., from the state shown in FIG. 6 to FIG. 8, as shown in FIG. 9, the attachment part 84 (extension tube 91 and floor brush 92) is detached in the air passage body 13, and cleaning is performed while the entire electric vacuum cleaner 11 is moved by gripping the main body handle 15.

At this time, the attachment part 84 (extension tube 91) is detached from the suction port body part 83 by operating the holding clamp 89. Then, the user performs cleaning with the brush part 87, etc., of the suction port body part 83 by making the electric vacuum cleaner 11 suck dust together with air from the suction port body part 83 while carrying the entire electric vacuum cleaner 11 by gripping the main body handle 15.

Figure 10:
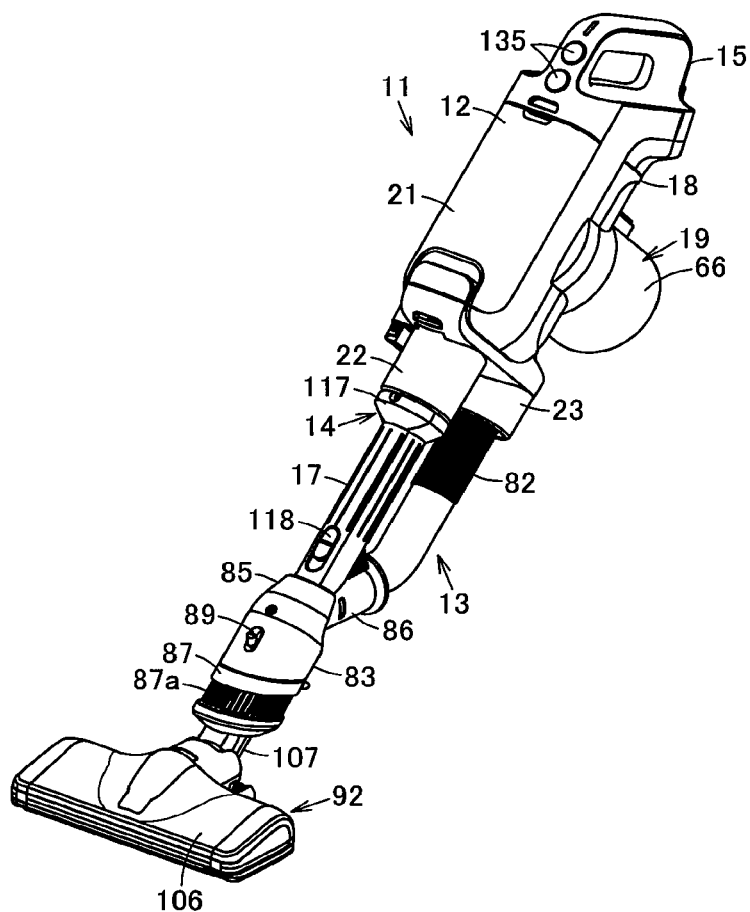
FIG. 10 is a perspective view showing still another usage state of the same electric vacuum cleaner where the air passage body is attached to the main body part by the holder part.

At this time, according to the necessity of the kind of the surface to be cleaned, etc., the electric vacuum cleaner 11 can also be used in the state where only the floor brush 92 is attached to the suction port body part 83 (FIG. 10). In this case, by inserting the rotary tube 107 of the floor brush 92 into the suction port body part 83 from the upstream side, the floor brush 92 is held in the state where it is connected airtightly to the suction port body part 83 by the operation of the holding clamp 89. Then, while making the floor brush 92 placed on the surface to be cleaned travel alternately forward and backward on the surface to be cleaned together with the entire electric vacuum cleaner 11, the user makes the electric vacuum cleaner 11 suck dust together with air from the suction port by the action of the negative pressure of the electric blower 25 on the surface to be cleaned. The user also performs a cleaning assisting operation such as scraping-off dust from the surface to be cleaned or polishing the surface to be cleaned by rotationally driving the rotary brush of the floor brush 92 as necessary.

Further, in the case of cleaning at a relatively high position, for example, a ceiling, etc., from the state shown in FIG. 8, as shown in FIG. 4, the air passage body 13 is detached from the main body part 12 by the holder part 14, and while the main body part 12 is carried and the hose body 82 of the air passage body 13 is stretched (expanded and contracted) with respect to the main body part 12, cleaning is performed with the suction port part 97 on the front end portion of the extension tube 91.

In the case of cleaning at a position near the hand of a user, for example, a position behind an installed object such as a television, a vehicle seat, and stairs, etc., as shown in FIG. 5, the extension tube 91 is detached from the state shown in FIG. 4, and while the main body part 12 is carried and the hose body 82 of the air passage body 13 is stretched (expanded and contracted) with respect to the main body part 12, cleaning is performed with the suction port body part 83.

In the case of these cleaning manners shown in FIG. 4 and FIG. 5, by operating the clamp body 118, in the state where the claw part of the clamp body 118 is pulled out from the engagement receiving portion of the holder receiving part 22, the air passage body 13 is moved forward with respect to the main body part 12, and accordingly, in the holder part 14, the joint part 117 on the rear end portion of the air passage body handle 17 is separated from the holder receiving part 22 of the main body part 12, and the connecting projection part 122 is pulled out from the holder receiving part 22.

Then, while the main body part 12 is lifted by gripping the main body handle 15 by one hand of a user, the air passage body handle 17 is gripped by the other hand, and basically, while only the air passage body 13 is moved by expanding and contracting the hose body 82, cleaning is performed by sucking dust together with air by using the brush bristle part 102 of the suction port part 97 or the brush part 87 of the suction port body part 83.

In the case of cleaning of a range which can be reached by only stretching the hose body 82, or in the case of cleaning at a position below a bed, etc., the main body part 12 may be placed on the surface to be cleaned without being lifted by gripping the main body handle 15. At this time, by the contact of the ribs 75 with the surface to be cleaned, the exhaust opening 76 on the lower portion of the dust collecting cup 19 is separated from the surface to be cleaned and is not closed by the surface to be cleaned, so that exhaust from the exhaust tube part 74 (exhaust opening 76) is not obstructed.

Then, air containing dust sucked into the dust collecting cup 19 (dust collecting cup main body 66) of the first centrifugally separating part 32 is turned between the inner circumferential surface of the dust collecting cup 19 (dust collecting cup main body 66) and the outer circumferential surface of the separating body part main body 41 of the separating body part 33 and extremely large dust (coarse dust) is centrifugally separated due to its own weight from the air, and falls along the inner circumferential surface of the dust collecting cup main body 66 and is collected in the dust storing part 71 of the dust collecting cup main body 66. This dust is pressed against the compression filter 48 and compressed according to passing of a portion of the turning flow inside the dust collecting cup main body 66 through the compression openings 47 (compression filter 48) from the lower end portion of the compressing part 43, and is stored inside the compressing part 43.

Air from which dust was centrifugally separated flows into the openings 44 while passing through the separating filter 45. The air that passed through the openings 44 (separating filter 45) indirectly cools the electrically-driven part 25a and the centrifugal fan 25b of the electric blower 25 housed inside the electric blower chamber 26 by directly cooling the electric blower chamber 26 partitioned by the communicating air passage part 35 and the partition 64 by passing through the communicating air passage part 35 while being straightened by the smooth cylindrical outer circumference of the exhaust part 42. Further, this air that passed through the communicating air passage part 35 flows into the second centrifugally separating parts 36 (separating cylinder parts 37) via the suction opening parts 37a, and is turned along the inner circumferential surfaces of the separating cylinder parts 37 in the second centrifugally separating parts 36, and fine dust is further centrifugally separated. This separated fine dust falls from the dust discharge ports 37b of the lower end portions of the separating cylinder parts 37 to the fine dust receiving part 68 of the dust collecting cup 19 and is collected therein. That is, coarse dust and fine dust are separately collected in the dust collecting cup main body 66 and the fine dust receiving part 68. The air from which the fine dust was separated flows into the air passage part 38 from the discharge opening parts 49a of the discharge cylinder parts 49 on the upper end portion of the separating cylinder parts 37 and is sucked into the intake port 25c of the electric blower 25 via the air passage part 38.

The air sucked into the electric blower 25 is sucked from the central portion of the centrifugal fan 25b and blown in the radial directions from the outer circumference of the centrifugal fan 25b, and further passes through the inside of the electrically-driven part 25a and becomes exhaust wind while directly cooling the electric blower 25 (centrifugal fan 25b and electrically-driven part 25a), and is discharged from the exhaust port to the inside of the electric blower chamber 26, and then, passes downward through the inside of the separating body part 33 from the discharge opening 65 at the lower portion of the electric blower chamber 26 while being straightened by the smooth inner circumferential surfaces of the exhaust part 42 and the exhaust tube part 74, and is discharged downward to the outside of the dust collecting cup 19 (main body part 12) from the exhaust opening 76.

When cleaning is finished, the user stops the electric blower 25 by operating the setting buttons 135.

To dispose of dust, the clamp 70 is operated to detach the dust collecting cup 19 from the main body case 18 (attaching opening part 31), and the dust collecting cup 19 is turned upside down over a trash box, etc., to discharge the dust from the dust storing part 71 and the fine dust receiving part 68.

As described above, according to the first embodiment described above, by disposing the second centrifugally separating parts 36 with diameters smaller than the diameter of the first centrifugally separating part 32 on the sides (front and rear sides) opposite to each other with respect to the electric blower 25, air is sucked in a well-balanced manner from the second centrifugally separating parts 36 to the electric blower 25, and while the air intake balance is secured, the quietness can be improved by the second centrifugally separating parts 36 without increasing the size of the main body part 12 (electric vacuum cleaner 11).

Figure 11:
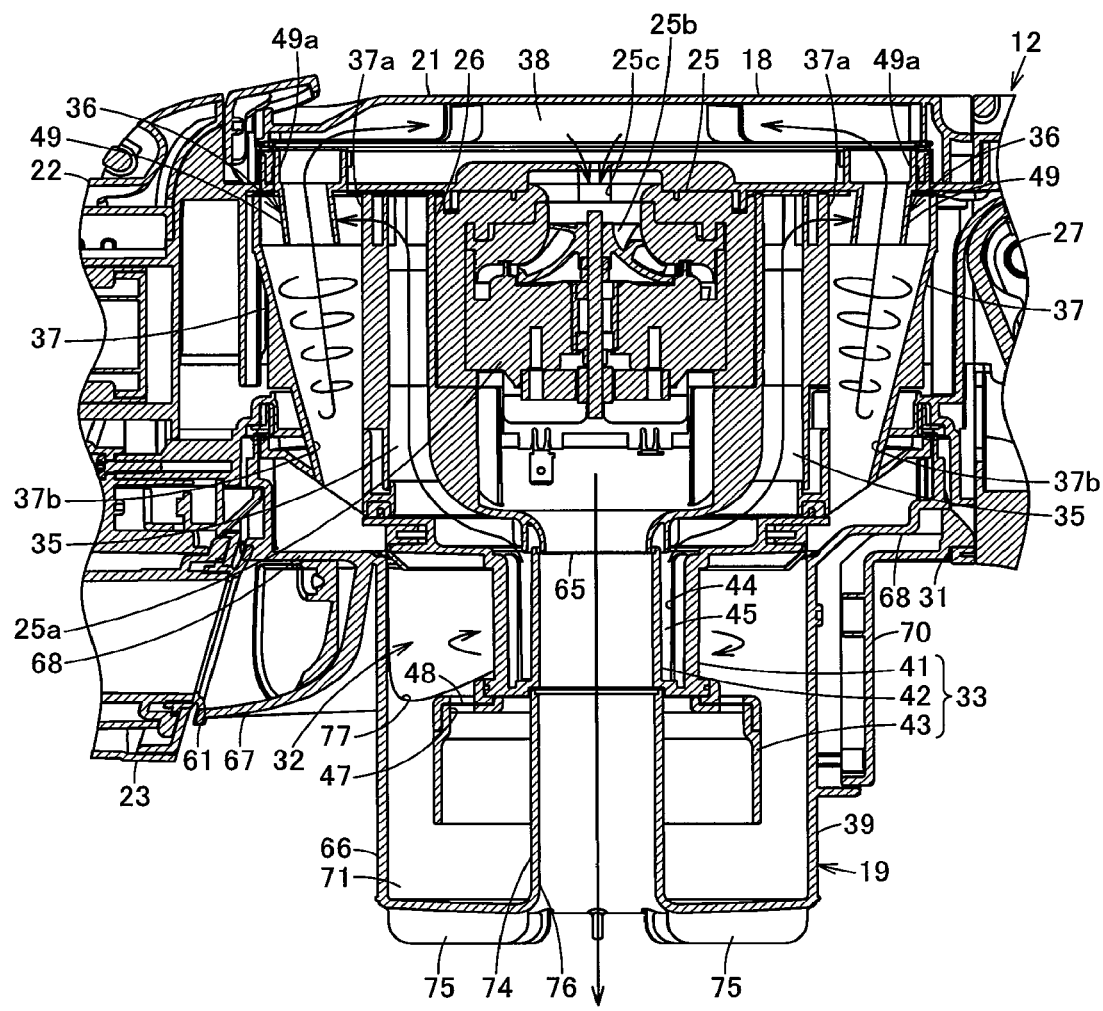
FIG. 11 is a sectional view showing a portion of a main body part of an electric vacuum cleaner according to a second embodiment.

Next, a second embodiment is described with reference to FIG. 11. The same constitutions and operations as in the first embodiment described above are designated by the same reference symbols, and description thereof is omitted.

According to this second embodiment, in the first embodiment described above, the axial directions of the second centrifugally separating parts 36 (separating cylinder parts 37) are along the up-down direction, and incline so that the lower end sides, that is, the dust discharge port 37b sides thereof are close to the electric blower 25 side. Therefore, the suction opening parts 37a positioned on the upper end sides of the second centrifugally separating parts 36 (separating cylinder parts 37) incline so as to separate outward (in the radial directions) from the communicating air passage part 35. The outer circumferential portions on the electric blower 25 sides of the second centrifugally separating parts 36 (separating cylinder parts 37) are substantially perpendicular (vertical).

By thus separating the suction opening parts 37a from the communicating air passage part 35 by inclining the second centrifugally separating parts 36 (separating cylinder parts 37), air containing dust smoothly flows from the communicating air passage part 35 and is sucked into the second centrifugally separating parts 36, so that a turbulence hardly occurs, and deterioration in efficiency and occurrence of noise to be caused by the turbulence can be reliably suppressed.

In the embodiments described above, three each of the second centrifugally separating parts 36 are disposed on the respective front and rear sides of the electric blower 25, however, for example, two each or four or more each of them may be disposed there.

According to at least one of the embodiments described above, by disposing each plurality of second centrifugally separating parts 36 on the respective (front and rear) sides opposite to each other with respect to the electric blower 25, air is sucked in a well-balanced manner from the second centrifugally separating parts 36 to the electric blower 25, and the air intake balance is secured. Noise generated from the electric blower 25 (electric blower chamber 26) is cut by the (front and rear) second centrifugally separating parts 36, and the outer circumferential portions of the separating cylinder parts 37 constituting the second centrifugally separating parts 36 serve as sound insulation walls. That is, the outer circumferential portions of the separating cylinder parts 37 of the second centrifugally separating parts 36 double-cut noise by the portions facing the electric blower 25 (electric blower chamber 26) and the portions on the opposite sides. Therefore, noise generated in the radial directions from the electric blower 25 (electric blower chamber 26) are multi-cut by the outer circumferential portions of the separating cylinder parts 37. As a result, the quietness can be reliably improved. Further, to centrifugally separate dust smaller than dust to be separated by the first centrifugally separating part 32, the separating cylinder parts 37 of the second centrifugally separating parts 36 have diameters set to be comparatively small so as to increase the flow velocities, so that even when the second centrifugally separating parts 36 are disposed on the sides opposite to each other across the electric blower 25 (electric blower chamber 26), the main body part 12 hardly increases in size.

In addition, each plurality of the second centrifugally separating parts 36 are disposed on at least a portion of the periphery of the electric blower 25, that is, in the present embodiment, on the respective front and rear sides of the electric blower 25, so that the front and rear sides of the electric blower 25 is surrounded by each plurality of second centrifugally separating parts 36. Therefore, the outer circumferential portions of the separating cylinder parts 37 of the second centrifugally separating parts 36 more reliably cut noise generated from the electric blower 25, so that the quietness can be more reliably improved.

By disposing the discharge opening parts 49a of the second centrifugally separating parts 36 at positions near the intake port 25c of the electric blower 25, that is, at substantially the same height as that of the intake port 25c in a range at a predetermined distance or less from the intake port, the resistance (airflow resistance in the air passage part 38) when the air to be sucked into the electric blower 25 from the second centrifugally separating parts 36 flows becomes small, so that the efficiency can be improved.

Further, by disposing the first centrifugally separating part 32 to be lower than the second centrifugally separating parts 36, the space in which the first centrifugally separating part 32 with a diameter that must be set to be relatively large for centrifugal separation of coarse dust is disposed can be secured without arranging the first centrifugally separating part 32 lateral to the second centrifugally separating part 36, and therefore, the main body part 12 (electric vacuum cleaner 11) can be more reliably prevented from increasing in size.

By disposing the same numbers (three each) of the second centrifugally separating parts 36 at the positions axisymmetric to each other about the electric blower 25 (in the front-rear direction), respectively, air is sucked in a well-balanced manner into the electric blower 25 from the same numbers of second centrifugally separating parts 36, so that the air intake balance can be further improved.

In addition, the second centrifugally separating parts 36 are disposed radially around the central axis of the electric blower 25, so that the distances from the second centrifugally separating parts 36 (discharge opening parts 49a) to the intake port 25c of the electric blower 25 are substantially equal to each other, so that air is sucked in a well-balanced manner from the second centrifugally separating parts 36 into the electric blower 25, so that the air intake balance can be further improved.

By disposing each plurality of the second centrifugally separating parts 36 in the direction between both sides on the respective front and rear sides of the electric blower 25, air is sucked in a well-balanced manner from the second centrifugally separating parts 36 into the electric blower 25, so that the air intake balance can be further improved, and by forming the communicating air passage part 35 that communicates with the upstream sides of these second centrifugally separating parts 36 so that the sectional area of the center side (central portion 35a) in the direction between both sides becomes relatively larger than that of both sides (both side portions 35b and 35b), the flow velocity at the central portion 35a with the relatively large sectional area becomes smaller than the flow velocities at both side portions 35b and 35b with relatively narrow sectional areas, so that the flow volume of air containing dust in proportion to the product of the sectional area and the flow velocity can be made equal between the central portion 35a and both side portions 35b and 35b, and the amounts of air containing dust to be sucked into the second centrifugally separating parts 36 can be made equal to each other. Further, the second centrifugally separating parts 36 are positioned on the front and rear sides of the electric blower 25, and are not positioned on the left and right sides of the electric blower, so that the main body part 12 (electric vacuum cleaner 11) does not become wide in the direction between both left and right sides, and the main body part 12 (electric vacuum cleaner 11) can be slimmed in the width direction, so that it can be further downsized.

Further, the electric blower 25 self-heats by being driven, and is cooled by air that flows therein from the intake port 25c of the electric blower 25 and passes through the inside after being sucked via the separating part 39, etc., however, a constitution capable of more efficiently cooling the electric blower 25 has been demanded. Therefore, by disposing the communicating air passage part 35 that makes communication between the first centrifugally separating part 32 and the second centrifugally separating parts 36 along the outside portion (outer circumferential portion) of the electric blower chamber 26 housing the electric blower 25, so-called cold air passing through the communicating air passage part 35 before being sucked into the electric blower 25 cools the electric blower 25 as well as the electric blower chamber 26. Therefore, the air before being sucked into the electric blower 25 can effectively cool the electric blower 25 from the inside and the outside together with the air sucked into the electric blower 25, so that the electric blower 25 can be more efficiently cooled.

In particular, by disposing the communicating air passage part 35 between the electric blower chamber 26 and the second centrifugally separating parts 36, not only can the electric blower 25 be efficiently cooled together with the electric blower chamber 26, but also noise leaking in the radial directions from the electric blower 25 (electric blower chamber 26) is cut by the communicating air passage part 35 and the second centrifugally separating parts 36. That is, the communicating air passage part 35 and the outer circumferential portions of the separating cylinder parts 37 constituting the second centrifugally separating parts 36 serve as sound insulation walls, so that the quietness can be further improved. Further, to centrifugally separate dust smaller than dust to be separated by the first centrifugally separating part 32, the separating cylinder parts 37 of the second centrifugally separating parts 36 have diameters set to be comparatively small so as to increase the flow velocities, so that even when the second centrifugally separating parts 36 are disposed lateral to the electric blower 25 (electric blower chamber 26), the main body part 12 hardly increases in size, and not only the partition 64 but also the outer circumferential portions of the separating cylinder parts 37 of the second centrifugally separating parts 36 double-cut noise by the portions (partition part 50 forming the outside portion of the communicating air passage part 35) facing the electric blower 25 (electric blower chamber 26) and the portions on the opposite sides. That is, noise leaking in the radial directions from the electric blower 25 (electric blower chamber 26) are multi-cut by the communicating air passage part 35 and the outer circumferential portions of the separating cylinder parts 37. As a result, the quietness can be more reliably improved.

In the state where air is sucked into the electric blower 25, heat generation at the electrically-driven part 25a driven by power supply becomes largest, so that by cooling the electric blower chamber 26 covering the entire electric blower 25 including this electrically-driven part 25a, the electrically-driven part 25a whose heat generation is largest can be cooled not only directly by the air passing through the inside of the electrically-driven part 25a but also indirectly by the air passing though the communicating air passage part 35, so that the cooling efficiency of the electric blower 25 can be further improved.

In addition, each plurality of the second centrifugally separating parts 36 are disposed on at least a portion of the periphery of the electric blower 25, that is, in the present embodiment, on the respective front and rear sides of the electric blower 25, so that the front and rear sides of the electric blower 25 is surrounded by the communicating air passage part 35 and the plurality of second centrifugally separating parts 36. Therefore, these communicating air passage part 35 and separating cylinder parts 37 of the second centrifugally separating parts 36 more reliably cut noise leaking from the electric blower 25, so that the quietness can be more reliably improved.

Further, the partition 64 that partitions the electric blower chamber 26 and the communicating air passage part 35 is a common wall portion that respectively forms portions of the electric blower chamber 26 and the communicating air passage part 35, so that the electric blower chamber 26 is directly cooled by the air passing through the communicating air passage part 35. Therefore, the cooling efficiency of the electric blower 25 housed in the electric blower chamber 26 can be further improved.

By forming the separating cylinder parts 37 of the second centrifugally separating parts 36 integrally with the partition 64 constituting the communicating air passage part 35, the balance of the distances of the separating cylinder parts 37 of the second centrifugally separating parts 36 from the communicating air passage part 35 and the electric blower chamber 26 (electric blower 25) can be respectively kept constant, so that the efficiency and air intake balance can be improved.

By disposing the electric blower 25 and the second centrifugally separating parts 36 above the first centrifugally separating part 32, as compared with the case where, for example, the electric blower and the second centrifugally separating parts are disposed lateral to the first centrifugally separating part, while the disposition spaces for these can be secured, the main body part 12 (electric vacuum cleaner 11) can be prevented from increasing in size. In particular, the first centrifugally separating part 32 has a diameter set to be relatively large to centrifugally separate coarse dust, so that by disposing the first centrifugally separating part 32 at a position deviating from the lateral sides of the electric blower 25 and the second centrifugally separating parts 36, the main body part 12 (electric vacuum cleaner 11) can be effectively prevented from increasing in size.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electric vacuum cleaner comprising:
   an electric blower including an electrically-driven part and a fan to be rotated by the electrically-driven part; and
   a separating part that separates dust sucked by the electric blower, wherein
   the separating part includes:
   a first centrifugally separating part that centrifugally separates dust sucked by the electric blower; and
   a plurality of second centrifugally separating parts that communicate with the downstream side of the first centrifugally separating part, and are disposed at positions opposite to each other across the electrically-driven part and the fan of the electric blower, and centrifugally separate dust smaller than dust to be separated by the first centrifugally separating part.

2. The electric vacuum cleaner according to claim 1, wherein
   the second centrifugally separating parts have discharge opening parts disposed near an intake port of the electric blower.

3. The electric vacuum cleaner according to claim 2, wherein
   the second centrifugally separating parts have axial directions along the up-down direction substantially equal to the axial direction of the electric blower, and lower end sides inclining toward the electric blower side.

4. The electric vacuum cleaner according to claim 1, wherein
   the first centrifugally separating part is positioned to be lower than the second centrifugally separating parts.

5. The electric vacuum cleaner according to claim 1, wherein
   the same numbers of the second centrifugally separating parts are disposed at positions axisymmetric to each other across the electric blower, respectively.

6. The electric vacuum cleaner according to claim 1, wherein
   the second centrifugally separating parts are disposed radially around the central axis of the electric blower.

7. The electric vacuum cleaner according to claim 1, wherein
   one or more of the second centrifugally separating parts are positioned on the respective front and rear sides of the electric blower, and
   the electric vacuum cleaner comprises a communicating air passage part that communicates with the upstream sides of the second centrifugally separating parts and is widest at the center of the respective front and rear sides of the electric blower in a planar view.

8. The electric vacuum cleaner according to claim 1, comprising:
   an electric blower chamber housing the electric blower; and
   a communicating air passage part that is disposed along the outside portion of the electric blower chamber and makes communication between the first centrifugally separating part and the second centrifugally separating parts.

9. The electric vacuum cleaner according to claim 1, comprising:
   an electric blower chamber housing the electric blower; and
   a communicating air passage part that is disposed between the electric blower chamber and the second centrifugally separating parts and makes communication between the first centrifugally separating part and the second centrifugally separating parts, wherein
   the second centrifugally separating parts are disposed lateral to the electric blower chamber.

10. The electric vacuum cleaner according to claim 1, wherein
    the electric blower and the second centrifugally separating parts are disposed above the first centrifugally separating part.

11. The electric vacuum cleaner according to claim 8, comprising:
    a partition that partitions the electric blower chamber and the communicating air passage part, and respectively forms portions of the electric blower chamber and communicating air passage part.

12. The electric vacuum cleaner according to claim 8, comprising:
    a partition that partitions the electric blower chamber and the communicating air passage part, and respectively forms portions of these electric blower chamber and communicating air passage part.

13. The electric vacuum cleaner according to claim 11, wherein:
    the second centrifugally separating parts include separating cylinder parts that turn air containing dust inside, and
    the partition is formed integrally with the separating cylinder parts.

14. The electric vacuum cleaner according to claim 12, wherein:
    the second centrifugally separating parts include separating cylinder parts that turn air containing dust inside, and
    the partition is formed integrally with the separating cylinder parts.

* * * * *